Oct. 9, 1956  E. S. WILHELM  2,766,426
TOTAL MAGNETIC FIELD WELL LOGGING METHOD AND APPARATUS
Filed Aug. 3, 1950  4 Sheets-Sheet 1

EUGENE S. WILHELM
INVENTOR.

BY D. Carl Richards
AGENT

Oct. 9, 1956       E. S. WILHELM       2,766,426
TOTAL MAGNETIC FIELD WELL LOGGING METHOD AND APPARATUS
Filed Aug. 3, 1950       4 Sheets-Sheet 2

EUGENE S. WILHELM
INVENTOR.

BY D. Carl Richards

AGENT

Oct. 9, 1956  E. S. WILHELM  2,766,426
TOTAL MAGNETIC FIELD WELL LOGGING METHOD AND APPARATUS
Filed Aug. 3, 1950  4 Sheets-Sheet 3

EUGENE S. WILHELM
INVENTOR.

BY D. Carl Richards
AGENT

Oct. 9, 1956 E. S. WILHELM 2,766,426
TOTAL MAGNETIC FIELD WELL LOGGING METHOD AND APPARATUS
Filed Aug. 3, 1950 4 Sheets-Sheet 4

EUGENE S. WILHELM
INVENTOR.

BY D. Carl Richards
AGENT

United States Patent Office 2,766,426
Patented Oct. 9, 1956

2,766,426

TOTAL MAGNETIC FIELD WELL LOGGING METHOD AND APPARATUS

Eugene S. Wilhelm, Dallas, Tex., assignor, by mesne assignments, to Socony Mobil Oil Company, Inc., a corporation of New York Application August 3, 1950, Serial No. 177,353

8 Claims. (Cl. 324—43)

This invention relates to the measurement of the intensity of the earth's magnetic field and more particularly to the measurement of variations in the total magnetic field in a bore hole penetrating earth formations of varying magnetic properties.

It is well known that for many purposes the earth may be considered to be an extremely large permanent magnet. In view of the fact that a body of magnetic material in a magnetic field may produce field distortion, geophysicists utilize surface measurements of the earth's magnetic field for detection of the presence of magnetic masses that contrast with their surroundings. A more complete understanding of the geological section in a given area thereby may be had.

It has been found desirable to measure variations in the intensity of the earth's magnetic field as a function of depth in a bore hole as an indication of variations in the properties of the adjacent formations. In the continuing effort in various mineral industries, including petroleum, to delineate earth structure, all measurable parameters available are considered in an effort to understand more fully the nature of the formations underlying a given area. The present invention provides a system for making a continuous measurement of the intensity of the earth's magnetic field as a function of depth in a bore hole.

In accordance with the present invention, the intensity of the earth's magnetic field throughout the length of the bore hole is measured by moving a detecting element along the bore hole, the detecting element being sensitive to its positional relation with respect to the direction of the magnetic field within the bore hole. The orientation of the detecting element is continuously changed by rotating it about two mutually perpendicular axes with change in its position relative to the direction of the earth's magnetic field to maintain the element parallel to the earth's magnetic field irrespective of the inclination of the detecting element with respect to vertical or of the rotation thereof with respect to the axis of the bore hole.

More particularly, an exploring unit is provided for a bore hole exploring system which comprises a housing supported from one end of a cable for lowering and raising the housing in a bore hole. Bearing means are provided within the housing for supporting a frame for rotation about a longitudinal axis of the housing with driving means within the housing for rotating the frame through an unlimited number of revolutions to compensate for the rotation of the housing within the bore hole. Bearing means carried by the frame supports a subframe for rotation about an axis perpendicular to the axis of the housing, the sub-frame supporting in turn three magnetometer elements with their axes oriented in mutually perpendicular directions. Driving means with the housing is provided for rotating the sub-frame independently of the rotation of the frame. Circuits which extend through the housing from the cable to the magnetometer elements include frictional contacts for energizing the magnetometer elements without restricting the number of revolutions through which the frame may be rotated. Means responsive to the outputs of two of the magnetometer elements provide a control for driving the frame and sub-frame to maintain the third magnetometer element parallel to or in alignment with the earth's magnetic field. A circuit responsive to the output of the third magnetometer element is utilized to measure the intensity of the magnetic field.

For a further understanding of the present invention, reference may now be had to the following description taken in conjunction with the accompanying drawings in which.

Figures 1, 2:
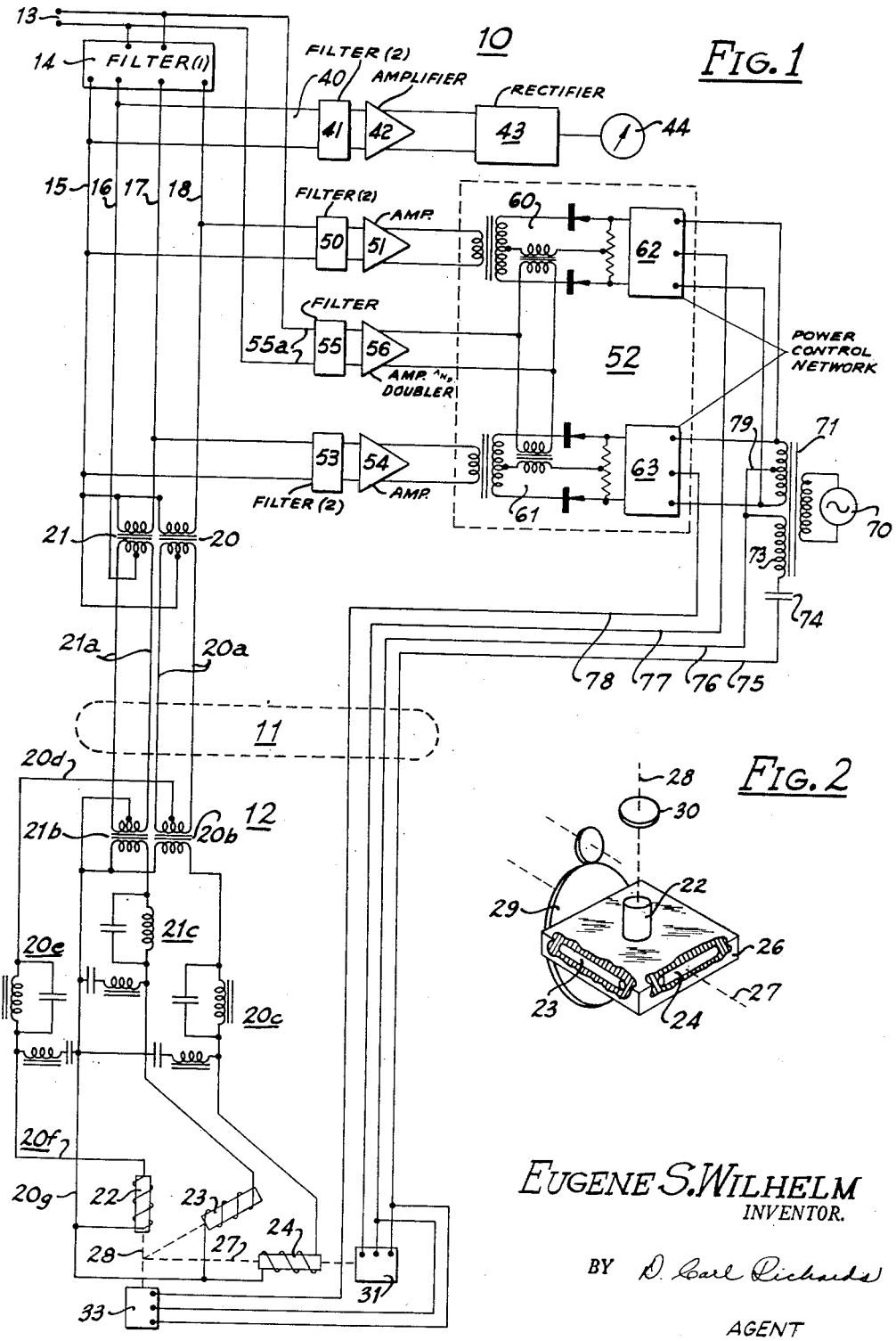
Fig. 1 is a schematic representation of the magnetic logging system.
Fig. 2 is a fragmentary view of elements of the magnetic detecting head.

Referring now to Fig. 1, there is shown a schematic diagram of a magnetic logging system. This system includes a surface unit 10 coupled by way of a multiconductor cable 11 to a magnetometer exploring unit 12. The cable 11 may be mechanically driven or controlled by a suitable winch or other means to position unit 12 at any desired depth in a bore hole penetrating formations to be studied.

Broadly, the operation of the system includes the transmission of currents of frequency $F_1$ downhole by way of cable 11 to the unit 12 to excite three flux gate magnetometer elements included in unit 12. Thus excited at frequency $F_1$, signals proportional to the earth's magnetic field are generated or produced by the magnetometer elements at a frequency $F_2$ harmonically related to the driving frequency. Signals from the flux gate magnetometer are then transmitted uphole over cable 11 to the surface unit 10. The magnitude of the signal from each magnetometer element is directly proportional to the strength of the magnetic field multiplied by the cosine of the angle between the axis of the element and a vector representing the earth's total magnetic field. One of the three magnetometer elements is maintained in alignment with the earth's magnetic field by utilization of signals produced from the other two magnetometer elements. The latter signals are utilized at the surface unit 10 in conjunction with a phase sensitive system to control the magnitude and the phase of power of frequency $F_3$ for driving motors mechanically coupled to the magnetometer elements.

More specifically, the system includes a source of alternating current (not shown) but whose output of frequency $F_1$ appears at terminals 13 and is applied to a filter 14 designed to pass frequency $F_1$. Filter 14 has three output circuits comprised respectively of a conductor 15, common to all three circuits, and conductors 16, 17, and 18. Currents of frequency $F_1$ appear between conductor 15 and each of conductors 16, 17 and 18 and are preferably adjusted to be equal in magnitude. The conductors 15, 16, 17 and 18 extend from the filter 14 to the input of the cable 11. In the form illustrated, a phantom circuit is utilized to provide three separate circuits over four cable conductors to the magnetometer elements in the unit 12. As illustrated, a first circuit is completed from filter 14 by way of conductor 18 through the primary of a transformer 20 to the common conductor 15. Similarly, a second circuit is completed from filter 14 by way of conductor 17 through the primary winding of a transformer 21 to the common conductor 15. The secondary winding of transformer 20 is connected to two conductors, the conductors 20a of the cable 11, which extend to and are terminated in one winding of a transformer 20b. Similarly, conductors 21a extend from the secondary of the transformer 21 to and are terminated in one winding of a transformer 21b. The output of transformer 20b is coupled by way of a filter network 20c to one magnetometer element 24, which together with magnetometer elements 22 and 23 are the field sensitive elements of the unit 12. Thus exciting currents flowing in the conductor 18 are transmitted by way of conductors 20a, transformer 20b and filter network 20c to the winding of the magnetometer element 24.

The output of transformer 21b is coupled by way of a filter network 21c to the winding of the magnetometer element 23, permitting transmission of exciting currents flowing in conductor 17 to the magnetometer element 23 by way of conductors 21a, transformer 21b and filter network 21c. The phantom circuit for the third magnetometer element 22 is provided by connecting conductors 15 and 16 to the center taps on the secondary windings of the transformers 20 and 21 respectively. Thus the conductors 20a serve as one side of the circuit extending through the cable 11 for the exciting currents for the magnetometer element 22 and the conductors 21a serve as the other side of the circuit. Since conductors 15 and 16 are connected symmetrically with respect to the windings of the transformers 20 and 21, no signal is developed in the outputs of transformers 20b and 21b due to currents flowing in conductor 16. The currents proportional to those flowing in conductor 16 are then coupled from the center tap of the winding of transformer 20b by way of conductor 20d, filter network 20e and conductor 20f to the magnetometer element 22. The return conductor 20g is electrically common to one terminal of each of the magnetometer elements 22, 23 and 24, to one terminal of each of the filter networks 20c 21c and 20e to a terminal of the output windings of transformers 20b and 21b and to the center tap of the input winding of the transformer 21b.

If a cable having a sufficient number of conductors shielded one from the other be used for deep bore hole logging, the phantom circuit need not be employed but in any event it is necessary that the circuits extending to the magnetometer elements 22, 23 and 24 be isolated so that the elements may be independently excited and, additionally, so that signals generated in the magnetometer elements proportional to the earth's magnetic field will be transmitted back to the surface by way of the cable 11 to detecting circuits independently of one another.

As illustrated in Fig. 2, the magnetometer elements 22, 23 and 24 are mounted with each of them respectively parallel to each of three mutually perpendicular axes in a block 26 which may be of Lucite or other nonmagnetic material. As will further be explained, the block 26 forming a sub-frame is mounted in a frame 182, shown in Figs. 6 and 7, for rotation about the horizontal axis 27 and the vertical axis 28. Means such as the gears 29 and 30 suitably driven may be employed to vary the orientation of the block 26 so that the axis of the magnetometer element or detector element 22 may be placed in any direction necessary for alignment with the earth's magnetic field. As illustrated in Fig. 1, a reversible motor 31 is mechanically coupled to the magnetometer elements for rotation about the axis 27. A similar motor 33 is provided for rotating the system about axis 28.

Figure 3:
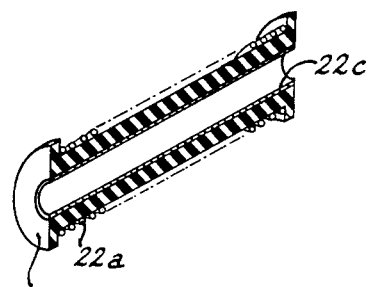
Fig. 3 is a cross sectional view of one of the sensitive elements of the magnetometer.

One of the magnetometer elements, the element 22, is shown in the sectional view of Fig. 3. Element 22 includes a coil 22a consisting of a single layer winding on a Lucite spool 22b containing a core 22c in the form of a rolled sheet of thin magnetic material of high permeability. With the axis of element 22 parallel with the earth's total magnetic field vector, current from filter 14 flowing therethrough drives the magnetic core 22c into saturation and thereby produces a second harmonic voltage ($2F_1$) proportional in magnitude to the strength of the earth's magnetic field. This voltage is transmitted up cable 11 and detected in circuit 40 which includes a filter 41, an amplifier 42, a rectifier 43 and a recorder or metering system generically represented by the meter 44. The filter 41 passes the second harmonic frequency ($2F_1$) and substantially rejects signals of all other frequencies. Since the magnitude of the second harmonic voltage is directly proportional to the strength of the magnetic field in which it is positioned, the voltage applied to meter 44 may be taken as a direct measure of the intensity of the earth's total magnetic field.

The transverse magnetometer element 24 is connected in circuit with a filter 50 and an amplifier 51 which feeds a phase detecting circuit in a sensing unit 52 (indicated by the dotted outline). The axial magnetometer element 23 drives the circuit including filter 53 and amplifier 54. The output of amplifier 54 also is applied to the sensing unit 52.

In order to obtain a reference voltage for the phase detecting circuit 52, a filter 55 and a frequency-doubling amplifier 56 are connected to terminals 13 by way of conductors 55a. Voltages of frequency $F_1$ are passed by filter 55 and are doubled to frequency $2F_1$ and then applied to the sensing unit 52. The sensing unit 52 includes phase comparators 60 and 61, both utilizing the reference voltage. The outputs of the phase comparators 60 and 61 are connected respectively to power controlling networks indicated by the blocks 62 and 63. A source of power 70 of frequency $F_3$ is coupled by way of transformer 71 to both of the power controlling networks 62 and 63. Additionally, by use of a secondary winding 73, power is supplied from the source 70 by way of a phase shifting condenser 74 and conductors 75 and 76 to one phase of each of the motors 31 and 33, the conductors 75 and 76 being electrically common to one phase of each of the two phase motors 31 and 33.

Power for the second phase of motor 31 driving magnetometer elements about the horizontal axis 27 is obtained from the power controlling network 62 and is connected to the second phase of the motor 31 by way of conductor 77. Similarly power for the second phase of motor 33 driving the magnetometer head about the vertical axis 28 is obtained from the power controlling network 63 by way of conductor 78. The frequency $F_3$ of the source 70 preferably differs substantially from $F_1$ or $2F_1$ and is determined by the requirements of the motors 31 and 33. In one embodiment the motors 31 and 33 required a 470 cycle driving voltage.

Since the conductor 75—78 extend through, and are a part of the cable 11, voltages of frequency $F_3$ are induced in conductors 20a and conductors 21a and interfere with operation of the system. More particularly, currents of frequency $F_3$ flowing in the elements 22—24 produced false indications of field strength. The filters 20c, 21c and 20e tuned to reject frequency $F_3$ serve to reduce the crossfeed effects to a negligible magnitude.

When the element 22 is in axial alignment with a vector representing the earth's total magnetic field, the magnetometer elements 23 and 24 are both normal to the total field vector and no signal of frequency $2F_1$ is generated by elements 23 and 24 for transmission to the sensing unit 52. However, when the case or the housing for the exploring unit 12 is tilted or rotated displacing the magnetometer 22 from the above alignment, the elements 23 and 24 are then parallel to a finite component of the total field, and a signal is generated in either or both the magnetometers 23 and 24 thus causing the immediate appearance of a voltage between conductors 77 and/or 78 and the center tap 79 of the transformer 71. The motors 31 and/or 33 are thereby energized for re-establishing alignment of the magnetometer element 22 with respect to the total field vector.

The foregoing has, in a general way, described the electrical system of the magnetometer as embodied in the present invention. The amplifier 51 and a circuit forming part of the sensing unit illustrated in Fig. 4 will now be described in greater detail.

Figure 4:
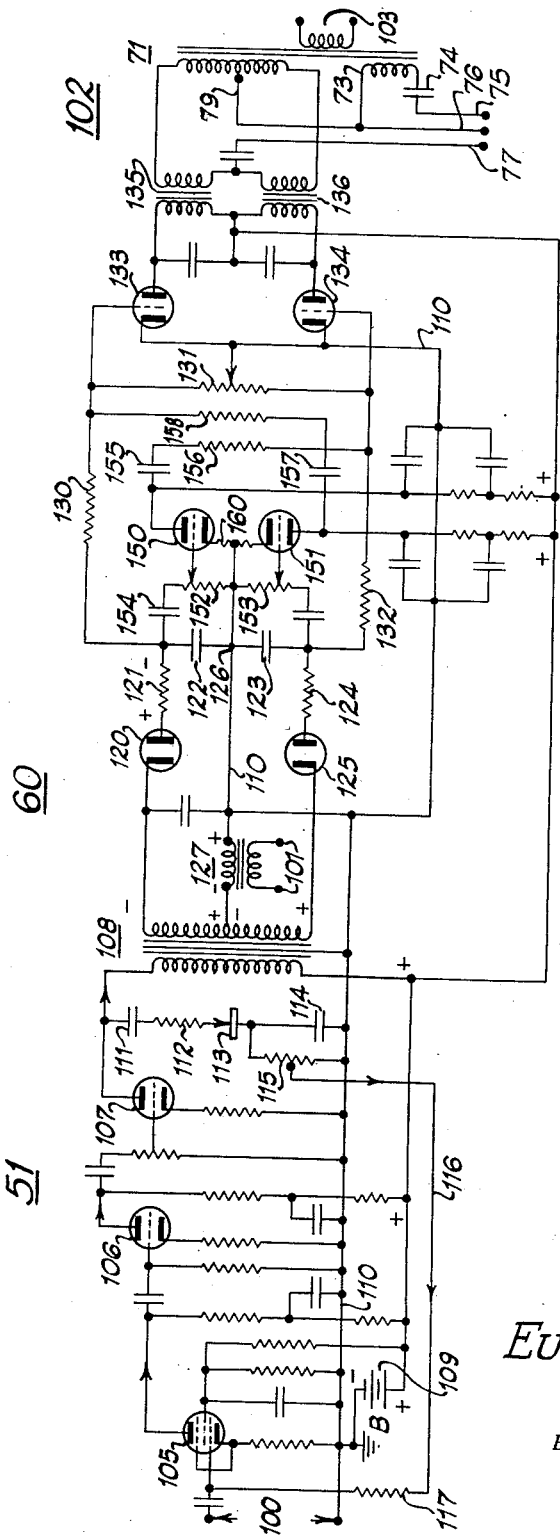
Fig. 4 is a schematic diagram of one of the control systems for the motors of Fig. 1.

The portion of the system illustrated in Fig. 4 performs the following functions. The signal from the transverse magnetometer element 24 is applied to the input 100 of the amplifier 51. The signal is phase detected in network 60 with respect to the reference voltage applied at terminals 101. The output of the phase detecting network 60 controls the balance or unbalance of a saturable core reactor bridge 102. Power from a source (not shown) connected to terminals 103 of transformer 71 is applied to the bridge and, upon unbalance of the bridge, delivers power to one phase of motor 31 via the circuit comprised of conductors 76 and 77.

More particularly, the second harmonic voltage $2F_1$ from the transverse magnetometer 24 will have a phase relation with respect to the reference voltage applied to terminals 101 which is dependent upon the direction of deflection of magnetometer element 24 from a position normal to the earth's magnetic field vector. That is, if a given end of a magnetometer is moved so that the earth's flux threads through it in one direction, the voltage will be opposite in phase to that generated when deflected in the opposite direction. The signal voltages thus generated in magnetometer elements 23 and 24 control the phase of the power voltage that appears between conductors 76 and 77 and the voltage that appears between conductors 76 and 78, Fig. 1, so that the motors mechanically coupled to the magnetometer elements cause the instrument to seek balance or alignment at all times.

In a more detailed explanation of the above circuit, the amplifier 51 is comprised of a pentode input tube 105, and triodes 106 and 107 which are resistance-capacitance coupled. The amplifier preferably has an overall gain from input terminals 100 to the output transformer 108 in the order of 10,000. The B-battery 109 is connected between the ground conductor or bus 110 and the anode circuits of each of tubes 105—107.

A rectifier circuit connected between the anode of tube 107 and ground is utilized to produce a gain control voltage for amplifier 51. The rectifier circuit includes condenser 111, resistance 112, rectifier 113 and condenser 114. Current flows through the rectifier 113 to place a charge on condenser 14 on alternate half cycles which is discharged through a parallel resistor 15. The voltage across resistor 115 is unidirectional and proportional to the output voltage from tube 107. A portion of the voltage across resistor 115 is fed back by way of conductor 116 and resistance 117 to the input grid of the tube 105. This feedback circuit is effective when unusually large signals are applied to terminals 100 substantially to reduce the gain of amplifier 51 to prevent over-driving of the following stages. Otherwise the system would be insensitive to direction for large unbalance signals.

The phase comparator 60 connected to the output of amplifier 51 includes the secondary of transformer 108 and a series circuit connected thereto including rectifier diode 120, resistance 121, condensers 122 and 123, resistor 124 and rectifier diode 125. The juncture 126 between the condensers 122 and 123, at ground potential, is connected through the secondary of transformer 127 to the midpoint or center tap on the secondary winding of the transformer 108. The reference voltage applied to the primary of transformer 127 at terminals 101 is rectified in diodes 120 and 125 and charges condensers 122 and 123 to equal voltages of negative polarity with respect to ground 110. The charge on condenser 122 flows through the circuit comprising resistor 130, the upper half of resistance 131 and thence to ground 110. Similarly, condenser 123 discharges by way of resistor 132, and the lower half of resistance 131 and thence to ground 110.

The voltages normally appearing across condensers 122 and 123 as a result of the application of the reference voltage to terminals 101 determines the bias level in the grid-cathode circuit of tubes 133 and 134 whose grids are connected to resistors 130 and 132, respectively. The cathodes of tubes 133 and 134 are connected to ground 110, and the anodes are connected to the primaries of two saturable core reactors 135 and 136, respectively. The anode currents determined by the bias level on tubes 133 and 134 are adjusted so that the saturable core reactors 135 and 136 operate below the knee of the B—H curve of each reactor core. The secondary windings of the reactors 135 and 136 are connected in series and to opposite ends of one of the secondary windings of the transformer 71.

As previously explained, one phase of the two-phase orienting motor is connected effectively between the center tap on the secondary of transformer 71 and the juncture between the secondaries of the saturable core reactors 135 and 136. When the signal at the input 100 of the amplifier is zero, the grids of tubes 133 and 134 operate at equal bias levels causing equal currents to flow through the saturable core reactors 135 and 136. Under this condition the bridge network 102 is at balance. Thus, when the voltage of frequency $F_3$ from primary 103 is effectively applied across the diagonal of the bridge defined by the extremities of the secondary winding of transformer 71, the bridge appears to be in balance as far as the source 103 is concerned.

The foregoing description concerns one condition of the sensing circuit, i. e., the condition of balance. In this condition, the detector element 22 of Fig. 1 is aligned with the earth's total magnetic field and the axial and transverse elements 23 and 24 are perpendicular thereto and therefore have zero second harmonic output. Assume now that the detector element 22 is out of alignment as it undoubtedly would be when the system is energized upon arrival at a hole to be surveyed. In this case, the circuit must respond to the unbalance voltages from the elements 23 and 24 to align the detector element 22. This re-alignment must occur regardless of the magnitude of the unbalance. Assume that a very small unbalance signal is generated in the element 24 and is applied to terminals 100 of the amplifier 51. The signal is amplified and applied to transformer 108. The currents flowing in the secondary of transformer 108 are added to the currents flowing therein due to the reference voltage applied to terminals 101 in one-half of the transformer secondary and are subtracted therefrom in the other half. Depending upon the phase relation between the signal applied to the transformer 108 and the reference signal applied at terminals 101, the voltage across condenser 122 will be raised or lowered, and this accompanied by a concurrent lowering or raising of the voltage across condenser 123. This results in a change or unbalance in the otherwise equal bias levels on tubes 133 and 134, which in turn changes the otherwise equal anode currents flowing in the saturable core reactors 135 and 136. If the current through the reactor 135 decreases, the impedance to currents of frequency $F_3$ induced in the associated secondary winding of transformer 71 will be much more whereas the increase in current through the reactor 136 will move the operating point on its B—H curve further toward saturation, thus lowering considerably the impedance of that arm of the bridge 102. The resultant unbalance of bridge 102 permits an immediate flow of current through the winding of the associated motor connected to the conductors 76 and 77 thereby mechanically to drive the element 24 toward a position normal to the total field vector.

When exceedingly large unbalance signals are produced by the magnetometer elements, the high gain amplifier 51 is capable of producing a voltage across the primary of transformer 108 greater than the reference voltage 101 which action, it must be recognized, would cause the phase detector to become insensitive to direction. In such case, the system would fail to re-orient the magnetometer elements properly and would be inoperative. This condition would probably be encountered each time the system is placed in operation since the elements would have an initial random orientation. To eliminate this difficulty, the feedback gain control voltage applied by way of conductor 116 and resistor 117 is adjusted, by varying the tap on the resistor 115, so that regardless of the unbalance the signal across transformer 108 may never exceed the reference voltage across the secondary of transformer 127. As above explained, the magnitude of the reference voltage is determined by the desired operating level of the grids of tubes 133 and 134. Thus the system may re-orient itself regardless of the degree of misalignment.

It will be recognized that the magnetometer system broadly is an electromechanical feedback system and has inertia both electrical and mechanical. If the system is to have sensitivity high enough to maintain accurate alignment with the earth's field, some means must be provided for eliminating hunting inherent in systems having high gain and extreme sensitivity. Provision is made for preventing hunting by the inclusion of tubes 150 and 151 and their associated circuits. The cathodes of tubes 150 and 151 are interconnected by resistance 160 having a center tap connected to the common juncture of grid resistors 152 and 153 and to point 126. Resistance 152 is connected in series circuit with a condenser 154. The series circuit is then connected across condenser 122 and the values of the series circuit components (resistor 152 and condenser 154) are so adjusted that the signal applied to the grid of tube 150 is a velocity function of the signal across condenser 122. Stated otherwise, the unbalance signal applied to the tube 133 is differentiated in the series circuit 152, 154 and the output of tube 150 is applied by way of condenser 155 and resistor 156 to the grid of tube 134. In a similar manner the signal across condenser 123 is differentiated and applied to the grid of tube 151 whose output is connected by way of condenser 157 and resistor 158 to the grid of tube 133. The crossfeed of the differentiated signals, which are velocity functions of the magnetometer unbalance, damps out any hunting in the electromechanical feedback system. Resistors 130 and 132 are provided to drop the high voltage across condensers 122 and 123 to a suitable level for the grids of tubes 133 and 134; while at the same time, permitting a sufficiently large signal across condensers 122 and 123 to obtain a differentiated signal of sufficient magnitude to provide the necessary damping.

The amplifier 54 and phase comparator 61 are identical in construction and operation to that above described and together with amplifier 51 and phase comparator 60 operate to maintain the magnetometer system in a preferred orientation in which element 22 is parallel to the earth's total magnetic field.

Figure 5:
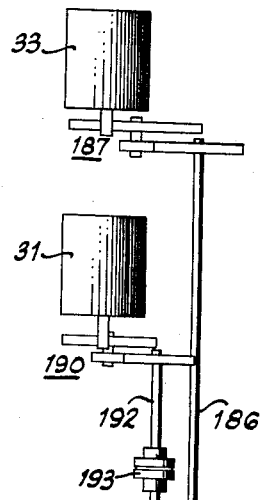
Fig. 5 is a view of the torpedo unit of the present invention.
Figure 5:

The foregoing discussion is related to features of operation and construction of the electrical circuits and associated components in maintaining the magnetometer system in the above-mentioned preferred orientation. In Fig. 5, there is illustrated a well torpedo 175 which houses the exploring unit (unit 12 of Fig. 1) of the above-described electrical system and which may be suspended from a winch or other suitable control on the surface of the earth by the cable 11. In the fragmentary view of Fig. 6, mechanisms housed in the torpedo 175 are illustrated and comprise the three mutually perpendicular magnetometer elements mounted in the Lucite block 26, in the manner shown in Fig. 2, for rotation about the axis 27. A shaft corresponding with axis 27 is journaled in arms 180 and 181 forming a part of a frame or head 182. The head 182 is provided with a hollow cylindrical extension or shaft 183 having a gear 30 attached thereto. A pinion (not shown in Fig. 6) meshing with gear 30 is carried by and coupled, by way of shaft 186, to a gear train 187 which is positioned at a point remote from the frame or head 182 so that the presence of magnetic material in the associated driving motors will not distort the magnetic field in the vicinity of the magnetometer elements. The gear train 187 is driven by motor 33. Upon excitation of motor 33, the frame 182 is rotated about the axis of the shaft 183 to orient the detector element 22 in an azimuth determined solely by the earth's magnetic field irrespective of the number of rotations of the torpedo 175 about its longitudinal axis as it travels through the bore hole suspended on cable 11.

Figure 6:
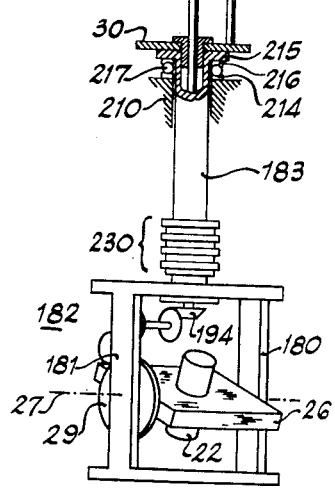
Fig. 6 is a view of the mechanical system.

Further, and as illustrated in Fig. 6, motor 31 coupled by way of gear train 190, shaft 192, and clutch 193 transmits a torque through the axis of the hollow shaft 183 to bevel gear 194 which is coupled to the gear 29 for rotation about axis 27 of the Lucite block 26 forming a sub-frame carried by the frame 182. The action of motor 31, when energized from signals derived from one of the magnetometer elements, is to maintain the magnetometer element 22 at a declination determined solely by the earth's magnetic field regardless of the deviations of the bore hole from vertical.

Figure 7:
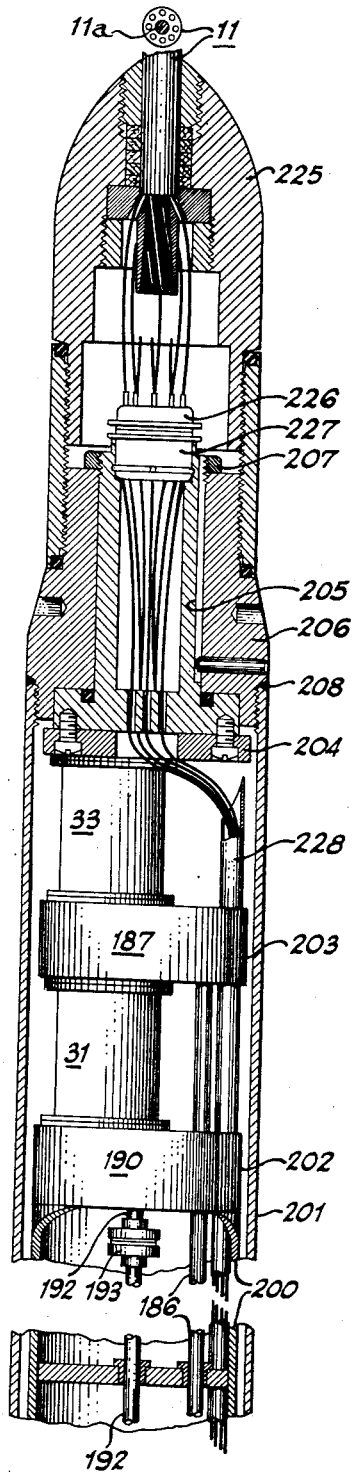
Fig. 7 is a cross sectional view of the torpedo unit.
Figure 7:
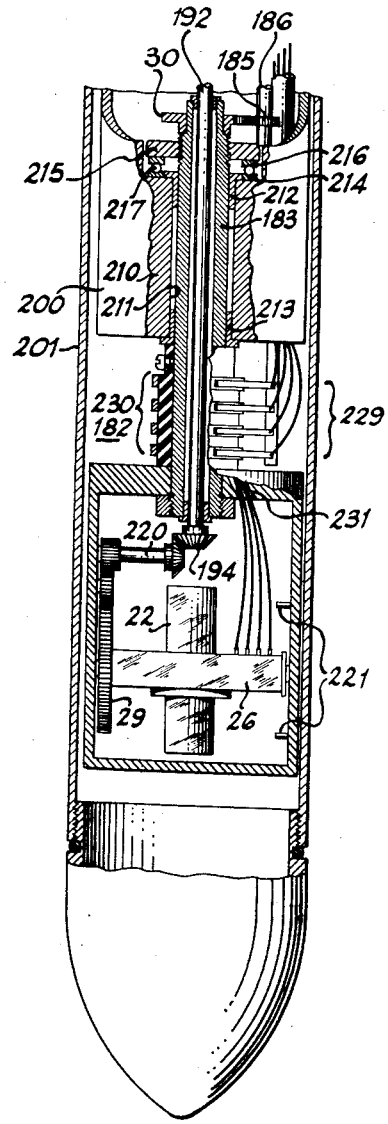

The system is illustrated in greater detail in the sectional view of Fig. 7 where for simplicity the elements forming the filters 20c, 21c and 20e of Fig. 1 have been omitted. A casing 200 is housed in an outer cylinder 201 of the torpedo 175. The casing 200 is a cylinder of non-magnetic material coupled at its upper end to a cylindrical housing 202 which encloses the gear train 190. The motor 31 driving gear train 190 is rigidly mounted on the upper face of the cylinder 202. A cylindrical housing 203 enclosing gear train 187 supports the motor 33. Above motor 33 there is provided a disc 204 bolted to a coupler 205 extending through a central channel in a sleeve 206. The coupler 205 is threadedly engaged at its upper end by a nut 207 rigidly to secure the appended elements to sleeve 206. Rigid bolts or spacers, not shown, extend from disc 204 to the cylindrical housing 203 and from housing 203 to housing 202 to suspend and support casing 200.

The casing 200 extends from the gear train housing 202 to near the lower end of the torpedo 175. At the lower end of the casing 200, a solid insert 210 is provided with a central channel 211 extending therethrough. The frame 182 supporting the magnetic elements is itself supported from the solid insert 210 by the hollow shaft 183. Bearings 212 and 213 are pressed into the opening 211 in the solid insert 210 to guide the shaft 183. A bearing race 214 may be provided as an integral part of the bearing 212. A nut 215 threadedly engaging the upper end of the shaft 183 carries a second bearing race 216. A plurality of balls of non-magnetic material such as beryllium-copper are provided in between the races 214 and 215 to form a thrust bearing for the support of the frame 182. The upper end of the shaft 183 has the gear 30 pressed thereon and engaged by the pinion 185 carried by shaft 186. Thus mounted, the frame 182 is mounted for free rotation about the vertical axis of the casing 200.

As explained briefly in connection with Fig. 6, the shaft 192 extends through a central opening in the hollow shaft 183 to a bevel gear 194 coupled by way of shaft 220 to a gear train meshing with the gear 29. Rotational motion of the vertical shaft 192 is transmitted through gear 194, shaft 220 and gear 29 to rotate the Lucite block 26 about a horizontal axis. Stops 221 are provided for limiting the rotation about the horizontal axis to slightly less than 180°. The clutch 193 permits motor 31 to rotate shaft 192 in response to signals from the transverse magnetometer even though the block 26 is against the stops 221. Since for most latitudes on the North American Continent the declination of the earth's magnetic field makes a considerable angle with respect to horizontal, a system having such limited rotation about the horizontal axis will ordinarily be able to orient itself.

The cable 11 entering the upper end of torpedo 175 is provided with eight conductors shown in Fig. 1 and additionally a central non-magnetic tension bearing member 11a. The tension bearing member 11a may be suitably secured or anchored in the upper end of cable head 225 to support the torpedo 175 in the bore hole. The conductors of the cable 11 extend to a plug 226 which is received by a socket 227 carried by the upper end of the coupler 205. As was explained in connection with Fig. 1, four of the conductors are provided for exciting the motors 31 and 33, and the other four conductors provide exciting-detecting circuits of the magnetometer elements in the Lucite block 26. As illustrated, the conductors leading to the magnetometers are threaded through a tube 228 which extends from above housing 203 to the lower end of the casing 200 to where the conductors are terminated at four frictional contacts 229. The frictional contacts 229 complete circuits to four slip rings 230 carried by an insulating cylinder mounted on the shaft 183. Conductors terminating in the slip rings 230 extend through a passage 231 to magnetometer terminals on the Lucite block 26, thus completing the circuits from the magnetometer elements to cable 11. The system thus constructed permits unlimited rotation of the cage about the vertical axis to orient the magnetometer element 22 in an azimuth determined solely by the earth's magnetic field and independently of the declination or rotation of the torpedo 175 as it travels through the bore hole.

A system constructed in accordance with the foregoing description makes possible the continuous detection and measurement of variations in the intensity of the earth's magnetic field while the detecting system passes through various formations and sediments lining the walls of the bore hole. The location of magnetic sections in a bore hole may thus be detected by their effect upon the intensity of the earth's magnetic field. By providing a high gain system, the detector element 22 may be maintained in very close alignment with the earth's magnetic field vector with corrections for misalignment as would otherwise impair such measurements being made instantly and continuously.

The detecting element 22, as it is moved through the length of the bore hole, is thus sensitive to its positional relation with respect to the direction of the magnetic field within the bore hole. By changing the orientation of the element 22 with respect to the housing within which it is mounted, the alignment between the detecting element and the earth's magnetic field vector may be maintained at all times irrespective of the inclination of the bore hole from vertical or of the number of rotations of the housing about the axis of the bore hole as it travels therethrough. Amplifiers 51 and 54 and their associated channels have sufficient sensitivity that the threshold signals required to actuate either of the motors 31 or 33 are developed in the magnetometers 23 or 24 for deviations of the magnetometer element 22 from alignment with the total field vector of an angle of less than a minute. For such small deviations, any error encountered in assuming perfect alignment between the detecting element and the total magnetic field is negligible.

While, for the purpose of illustrating and describing the invention, there have been shown in the drawings particular circuits and systems, it is understood that variations may be made in the circuits and the electromechanical feedback system in accordance with the principles set forth that are within the spirit and scope of the invention as set forth in the appended claims.

What is claimed is:

1. In a flux gate magnetometer system where two of three mutually perpendicular elements are utilized for generation of voltages for maintaining the third element in alignment with a vector representative of the earth's total magnetic field, the combination comprising amplifiers connected to each of said two elements and responsive to voltages produced thereby when said third element is displaced from said alignment, bridge circuits each having electro-mechanical couplings to said elements and respectively excited from first diagonals of said bridge circuits, a pair of impedances connected across the second diagonal of each of said bridge circuits, thermionic means for varying said impedances, phase comparator means connected between the output of such said amplifier and said thermionic means, a source of reference voltage connected in said phase comparator means for producing biasing voltages for said thermionic means to balance said bridge circuits, and gain control means in said amplifiers for limiting the output thereof to a value less than the effective value of said reference voltage whereby a signal from one or both of said first two elements will produce an unbalance in one or both of said bridge circuits for returning the third of said elements to alignment with said total field vector.

2. An exploring unit comprising a housing supported from one end by a cable, a frame within said housing, bearing means rotatably supporting said frame for rotation about a longitudinal axis of said housing, driving means within said housing for rotating said frame through an unlimited number of revolutions, a subframe, bearing means carried by said frame and supporting said subframe for rotation about an axis extending transversely of said housing, stop means in the path of said subframe to limit rotation to approximately one-half revolution, driving means within said housing for rotation said subframe independently of rotation of said frame comprising a frictionally coupled drive shaft disposed along the axis of rotation of said frame and including a driving connection interconnecting said drive shaft and said subframe, said driving connection as a whole being bodily rotatable with rotation of said frame in avoidance of a limiting effect upon the number of revolutions through which said frame may be rotated, three magnetometer elements supported by said subframe in three mutually perpendicular directions, means including conductors extending to said magnetometer elements and including relatively rotatable contacts in frictional engagement one with the other for completion of electrical circuits through said frame to said elements and for controlling the energization of said driving means in response to the outputs of two of said magnetometers for positioning the third magnetometer element parallel with the earth's magnetic field for measurement of the intensity of the earth's magnetic field with change of elevation of said unit.

3. In a flux gate magnetometer system where two of three mutually perpendicular elements are utilized for generation of voltages for maintaining the third element in alignment with a vector representative of the earth's total magnetic field, the combination comprising amplifiers connected to each of said two elements and responsive to voltages produced thereby when said third element is displaced from said alignment, bridge circuits having electro-mechanical couplings to said elements excited from a first diagonal thereof, a pair of impedances connected across the second diagonal of each of said bridge circuits, thermionic means for varying said impedances, phase comparator means connected between the output of each said amplifier and said thermionic means, and a source of reference voltage connected in said phase comparator means for producing biasing voltages for said thermionic means to balance said bridge circuits whereby a signal from one or both of said first two elements will produce an unbalance in one or both of said bridge circuits for returning the third of said elements to alignment with said total field vector.

4. In a flux gate magnetometer system where two of three mutually perpendicular elements are utilized for generation of voltages for maintaining the third element in alignment with a vector representative of the earth's total magnetic field, the combination comprising amplifiers connected to each of said two elements and responsive to voltages produced thereby when said third element is displaced from said alignment, bridge circuits having electro-mechanical couplings to said elements excited upon unbalance of said bridge circuits, a pair of impedances included in each of said bridge circuits, thermionic means for varying said impedances to unbalance said bridge circuits, phase comparator means connected between the output of each of said amplifier and said thermionic means, and a source of reference voltage connected in said phase comparator means for producing biasing voltages for said thermionic means to balance said bridge circuits whereby a signal from one or both of said first two elements will produce an unbalance in one or both of said bridge circuits for returning the third of said elements to alignment with said total field vector.

5. The combination set forth in claim 4 in which there is provided a differentiating circuit for each of said thermionic means, connections for applying the output from said phase comparator means to said differentiating circuits, and means for applying the resulting signal voltage from said differentiating circuits to said thermionic means for modifying the unbalance of said bridge circuits in accordance with a velocity function of the output signal from said phase comparator means.

6. An exploring unit comprising an elongated housing, a hollow shaft extending lengthwise of said housing, bearing supports for said shaft, a frame supported by and rotatable with said shaft, a sub-frame pivotally carried by said frame for rotation about a transverse axis at right angles to the longitudinal axis of said shaft, a second shaft extending through said hollow shaft and rotatable independently thereof, driving gears interconnecting said sub-frame and said second shaft for rotating said sub-frame about said transverse axis, and three magnetometer elements supported by said sub-frame in three mutually perpendicular directions for measurement of the earth's magnetic field.

7. The combination set forth in claim 6 in which slip rings are carried by and insulated from said hollow shaft, electrical conductors extending directly between said slip rings and said elements, and friction contacts carried by said housing and engaging said slip rings for completing electrical circuits to said magnetometer elements during unlimited relative rotation between said frame and said housing.

8. The combination set forth in claim 6 in which electrical motors are carried within said housing at the end portion remote from said elements, and driving gears respectively interconnecting said motors with said shafts.

References Cited in the file of this patent

UNITED STATES PATENTS

| | | |
|---|---|---|
| 2,246,542 | Smith | June 24, 1941 |
| 2,248,101 | Lohman | July 8, 1941 |
| 2,288,876 | Arnold | July 7, 1942 |
| 2,291,692 | Cloud | Aug. 8, 1942 |
| 2,468,554 | Hull | Apr. 26, 1949 |
| 2,468,968 | Felch | May 3, 1949 |
| 2,488,341 | Slonczewski | Nov. 15, 1949 |
| 2,488,389 | Felch et al. | Nov. 15, 1949 |
| 2,518,513 | Wyckoff | Aug. 15, 1950 |
| 2,555,209 | Vacquier | May 29, 1951 |
| 2,632,884 | Murphy | Mar. 24, 1953 |

OTHER REFERENCES

"Transactions, American Geophysical Union," vol. 30, No. 6, December 1949, pages 836–847.

"Electrical Engineering," July 1947, pages 680–685.